United States Patent Office 3,562,065
Patented Feb. 9, 1971

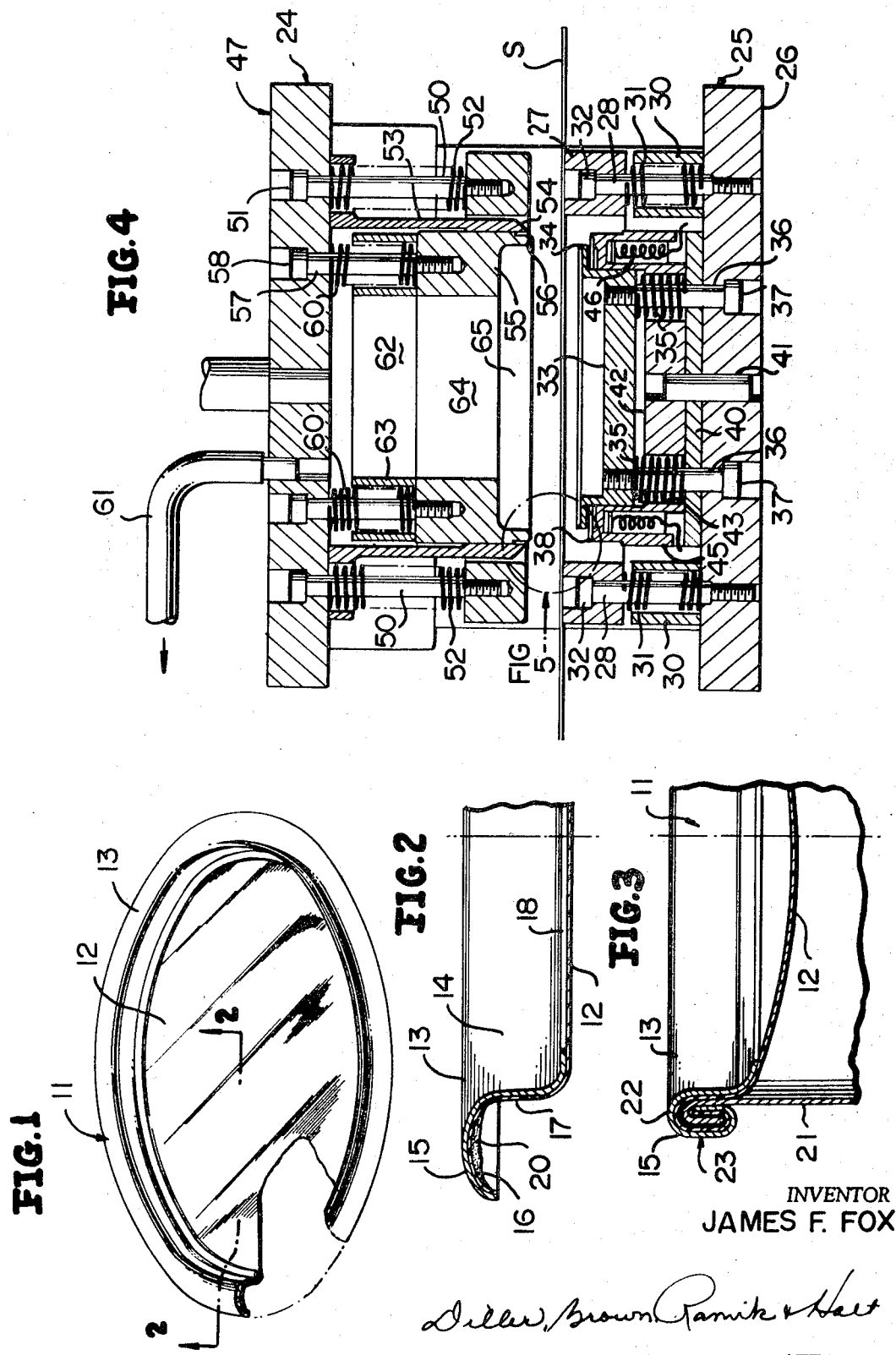

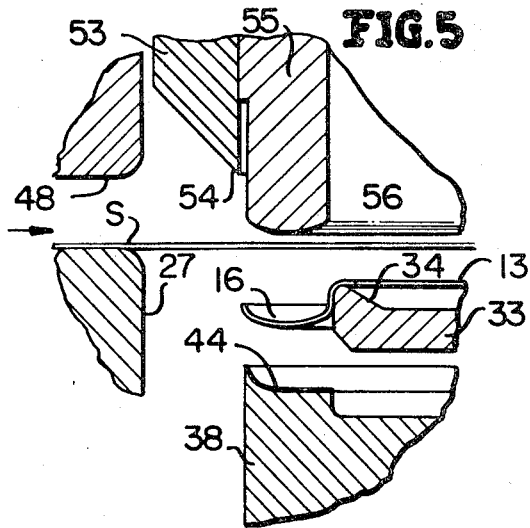
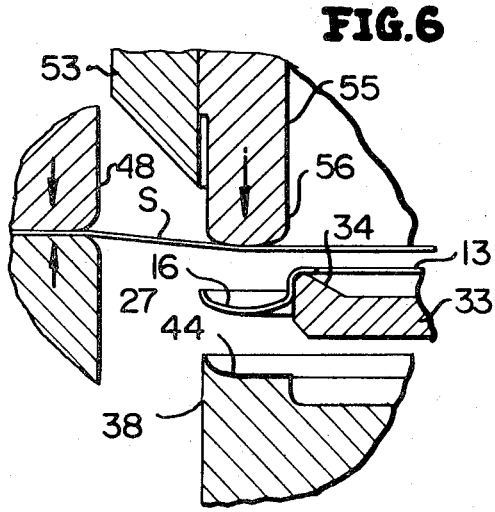
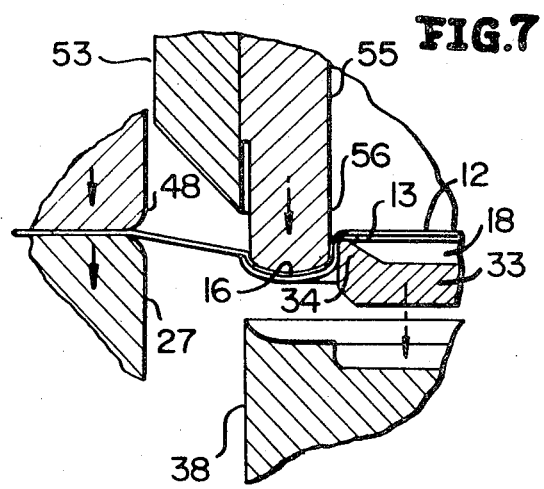
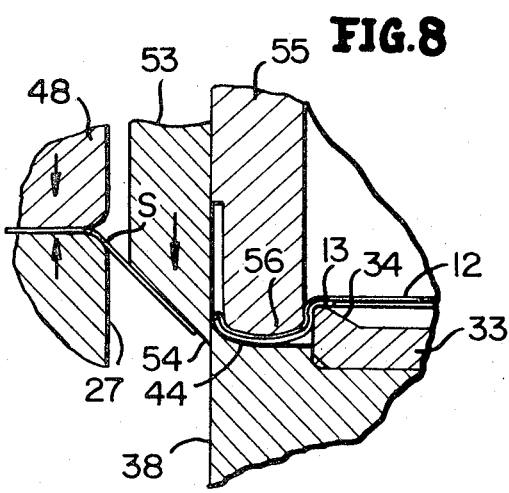
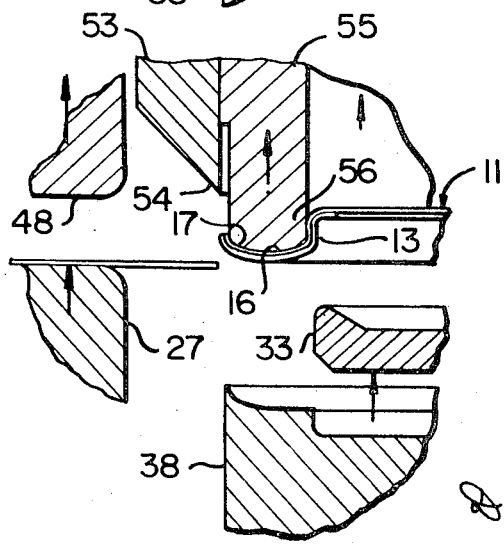

3,562,065
APPARATUS FOR MAKING WINDOW
CAN CLOSURES
James F. Fox, Chicago, Ill., assignor to Continental Can Company, Inc., New York, N.Y., a corporation of New York
Original application Sept. 23, 1966, Ser. No. 581,561, now Patent No. 3,472,417, dated Oct. 14, 1969. Divided and this application Feb. 26, 1969, Ser. No. 802,355
Int. Cl. B32b 31/00; B65d 25/34
U.S. Cl. 156—499                                    9 Claims

ABSTRACT OF THE DISCLOSURE

This disclosure relates to an apparatus for forming a composite can end of the type including an outer ring and a sheet of thermoplastic material stretched across and joined to the ring. The apparatus simultaneously tensions the thermoplastic material and conforms it to the cross section of the ring and heat seals the thermoplastic material to the ring.

---

This application is a division of application Ser. No. 581,561, filed Sept. 23, 1966, entitled Method of Making Window Can Closures, now Pat. No. 3,472,417 granted Oct. 14, 1969.

This invention relates to a novel composite can end construction wherein a can end comprises an outer ring and a sheet of thermoplastic material stretched across and joined to the outer ring, and in particular, to a novel apparatus for making composite can end structures having transparent material stretched across an outer ring to provide window can closures.

Various types of "window cans" or viewable containers having transparent plastic covers, which enable the ready viewing of products therein are presently available, and are constructed by procedures well known in the prior art.

One of the prior art procedures first preforms a transparent window or can end from a rigid or semi-rigid plastic and then bonds a metal rim to the preformed plastic can end, in order that the composite can end obtained may then be seamed to the can by curling the metal rim with a flange on the can. This procedure has been found to be undesirable in that it requires an excessive thickness of plastic for the window, thus raising production costs and increasing the number of required operations.

Another prior art method of providing a "window can" closure resides in placing a sheet of film across the open end of a container with excess plastic extending downwardly along the sides of the container and providing a metal ring to be curled with an upstanding flange of the can sidewalls in double-seamed relation, and then removing excess plastic extending beyond the seam. This procedure also has been found to be undesirable in that the assembly procedures for such a can are necessarily slow, particularly in that the excess plastic which protrudes from the double seam must often be trimmed by hand, and there is usually no provision for inserting a sealing compound between the plastic film and the flange of the can body to guarantee a hermetic seal which is of utmost importance when packaging articles such as food products.

The present invention overcomes many of the difficulties of the above-mentioned prior art techniques, in producing a "window can" end closure which eliminates the necessity of preforming the transparent plastic portion of the end closure, by stretching a sheet of transparent plastic across a preformed rim, bonding the plastic to the rim, removing the excess plastic by cutting away that portion which is used for a given end closure from the remainder of a provided sheet of plastic, double-seaming the ring with a projecting flange of a can body and providing a sealing compound between the can end closure and the flange in order to effect a hermetic seal therebetween.

The above noted method of making a transparent end closure is extremely desirable in that it permits the use of readily available plastic films, such as may be stretched across the metal ring, and which, in their stretched condition provide a can end which is under tension and which therefore provides a neat-appearing transparent closure of substantial strength.

It is, therefore, an object of this invention to provide a novel apparatus for forming a can end which is particularly adapted to stretch a sheet of bondable material across a ring and for bonding the stretched material to the ring while restraining unstretched portions of the bondable material in clamping engagement.

It is another object of this invention to provide a novel apparatus for forming a composite container end which includes a means for stretching a transparent sheet of thermoplastic material across a metallic ring and for forming portions of the bondable material which overlie the ring into conforming engagement with the ring while a cutting means moves first with the forming means and then relative thereto to cut away excess material which extends outwardly of the ring.

With the above and other objects in view that will hereinafter appear, the nature of the invention will be more clearly understood by reference to the following detailed description, the appended claims, and the several views illustrated in the accompaning drawings:

In the drawings:

FIG. 1 is a top perspective view of a composite container end of this invention, with a portion thereof broken away for clarity, and shows a stretched end closure bonded to and conforming to the configuration of an annular ring.

FIG. 2 is a fragmentary sectional view of the composite end closure of FIG. 1, taken along the line 2—2 of FIG. 1 and shows in greater detail the manner in which the plastic end closure conforms to the configuration of the ring.

FIG. 3 is a fragmentary sectional view of a container to which a composite container end of this invention has been applied, taken along a line similar to line 2—2 of FIG. 1.

FIG. 4 is a vertical sectional view of an apparatus particularly adapted to perform the method operations of this invention.

FIG. 5 is a fragmentary sectional view of a portion of the apparatus illustrated in FIG. 4 and shows an initial relation of the apparatus and the components to be secured together.

FIG. 6 is a fragmentary sectional view of the apparatus of FIG. 4 and shows a first operational step of the apparatus.

FIG. 7 is a fragmentary sectional view of the apparatus of FIG. 4, at a later sequential operational step than that shown in FIG. 6.

FIG. 8 is a fragmentary sectional view of the apparatus of FIG. 4, at a later sequential operational step than that shown in FIG. 7.

FIG. 9 is a fragmentary sectional view of the apparatus of FIG. 4 shown at a final formative stage thereof.

Referring now to the drawings in detail, reference is first made to FIG. 1, wherein there is illustrated a composite container end 11, comprising an end closure 12 of bondable plastic material and an annular ring 13 of metal or the like. The ring 13 includes an upstanding wall 14 and a flange forming portion 15 having a groove 16 formed on the inner surface thereof. The end closure 12 is in the form of a circular disc having peripheral edge portions 17 thereof configurated to conform to the groove 16 of the ring 13. The end closure 12 is tensioned completely across a circular void 18 of the ring, as by stretching and the peripheral edge portions 17 of the end closure 12 are bonded, as by heat sealing to the groove 16 of the ring 13. A sealing compound 20 is shown disposed on the end closure 12 about the peripheral edge portions 17 thereof.

In FIG. 3 there is illustrated the interconnection of the composite container end of FIGS. 1 and 2 with a container body 21. The peripheral flange forming portion 15 of the ring 13, with the peripheral edge portion 17 of the end closure 12 bonded in the groove 16 thereof, and with the sealing compound 20 applied to portion 17, is curled with a can body flange 22 into a double-seamed relation, thereby effecting an hermetic seal 23 between the composite container end 11 and the container body 21.

Because the elimination of all head space void in a container between a transparent container end and the products contained therein is desirable in that products which are immediately adjacent the transparent end closure may be more readily viewable through the transparent closure, the end closure 12 may then be additionally tensioned axially inwardly of the can body 21 as the composite container end 11 is double-seamed on to the container body 21. This can be accomplished by the use of a convex knock-out pad, carried by the double-seamer which contacts the outer surface of the end closure 12 within the area of the void 18 of the ring 13, as the double-seaming is effected, distending the center of the plastic film of the end closure 12 inwardly against the product surface and causing the displaced product to flow toward those corners defined by the junction of the composite container end 11 and the container body 21. This additional tensioning results in a taut, concave shaped composite container end free of voids and air pockets adjacent the transparent end closure 12, but which is also tensioned and retained in position by the air-tight nature of the seam of the container.

In FIG. 4 there is illustrated an apparatus for performing the various formative operations of the composite container end 11 comprising upper and lower base portions 24, 25, respectively. Lower base portion 25 includes a base plate 26 upon which is mounted an annular pressure pad lower clamp means 27, secured thereto by means of guide bolts 28 mounted within the sleeves 30. The pressure pad lower clamp means 27 is biased in a vertically upward direction by a means of a plurality of springs 31, and it is limited in vertical upward movement by the engagement of bolt heads 32 of the guide bolts 28 within the pressure pad lower clamp means 27.

Mounted on the base plate 26, inwardly of the pressure pad lower clamp means 27 is a container end support 33 having an annular engaging lip 34. The container end support 33 is resiliently biased in a vertically upward direction by springs 35 and is limited in vertical displacement from the base plate 26 by guide bolts 36 threaded into the support 33 and having heads 37 in engagement with the base plate 26.

A ring back-up member 38 is provided, having an upper surface thereof positioned slightly below the under surface of the engaging lip 34 of the container end support 33 being secured to the base plate 26 through a heater bottom plate 40 by means of a dowel pin 41. The ring backup member has a central portion 42 having bores 43 adapted to receive the springs 35 and the guide bolts 36. The ring back-up member 38 includes a ring contoured surface 44 on an upper peripheral surface of an annular ring-like heater housing 45. One or more heating coils 46 are disposed within the heater housing 45 and are adapted to raise the ring 13 and associated peripheral edge portion 17 of the end closure 12 to a desirable bonding temperature.

The upper base portion 24 includes a carrier plate 47 to which an annular pressure pad upper clamp means 48 is secured by means of guide bolts 50 threaded into the upper clamp means 48 and having bolt heads 51 secured to the carrier plate 47. Springs 52, mounted one each about guide bolts 50 bias the upper clamp means 48 away from the carrier plate 47 and the displacement of the upper clamp means 48 from the carrier plate 47 is limited by the bolt heads 51 in engagement with the carrier plate 47.

A cylindrical cutting blade 53, which terminates downwardly in a cutting edge 54 is carried by the carrier plate 47, inwardly of the upper clamp means 48.

A peripheral edge forming member 55 is also carried by the carrier plate 47, positioned inwardly of the cylindrical cutting blade 53. The forming member 55 has an integral downwardly extending annular forming element 56 thereon. The forming member 55 is carried by the carrier plate 47 and is attached thereto by means of guide bolts 57 being threaded into the forming member 55 and having heads 58 thereof secured to the carrier plate 47. A spring 60 is mounted about each guide bolt 57 and the springs 60 are adapted to resiliently bias the forming member 55 away from the carrier plate 47, the displacement of the forming member 55 from the carrier plate 47 being limited by engagement of the heads 58 of the guide bolts 57 in the carrier plate 47.

The carrier plate 47 also has a vacuum connection 61 attached thereto, communicating with a cylindrical void 62 in a stop ring 63 disposed above the forming member 55, with a cylindrical void 64 in the forming member 55, and with an enlarged cylindrical void 65 within the forming member 55 adjacent the forming element 56. The vacuum connection 61 is adapted to provide a source for retaining the composite container end 11 adjacent the forming element 56 after the formative steps on the composite container end are completed.

The annular pressure pad upper and lower clamp means 27 and 48, respectively, the container end support 33, the ring back-up member 38, the annular ring-like heater housing 45, the heater bottom plate 40, the cylindrical cutting blade 53, the peripheral edge forming member 55 and the stop ring 63 are all concentrically mounted at close tolerances in order to permit cooperating elements to be properly aligned during the various formative stages of the composite container ends.

OPERATION

In FIG. 5 there is illustrated a fragmentary view of the major operative components of this apparatus. A ring 13 is shown positioned on the container end support 33, being supported by the engaging lip 34 of the support 33. The ring 13 is illustrated with its groove 16 facing upwardly, in an inverted position from that shown in FIG. 2. A sheet S of bondable material is illustrated in position on the pressure pad clamp means 27, having been fed into overlying relation to the ring 13 from the left, in the direction of the arrow in FIG. 5. The annular pressure pad upper clamp means 48, the cylindrical cutting blade 53 and the forming member 55 are positioned above the sheet S in an inoperative position. The container end support 33 is in its uppermost position above the ring back-up member 38 in this position of the forming member 55.

In FIG. 6 there is illustrated the next consecutive operational step from that illustrated in FIG. 5, wherein the upper base portion 24 is moved vertically downwardly carrying the pressure pad upper clamp means 48, the cylindrical cutting blade 53 and the forming member 55. In this position the pressure pad upper clamp means 48 is shown to descend to contact the sheet S and to clampingly confine the sheet S as the upper clamp means descends, into clamping engagement with the lower clamp means 27. As the upper clamp means 48 descends to the position illustrated in FIG. 6, the forming element 56 of the forming member 55 contacts the sheet S, displacing a portion of the sheet located inwardly of the forming member 55 vertically downwardly from that portion of the sheet S which is confined between clamping means 48 and 27.

In FIG. 7 there is illustrated the relative positions of the various operative components of this apparatus during continued downward movement of the upper base portion 24, such that, during the downward movement of the base portion 24, carrying the pressure pad upper clamp means 48, the annular cutting blade 53 and the forming member 55, the pressure pad lower clamp means 27, in contacting engagement with upper clamp means 48 is also caused to move vertically downwardly while the vertically downwardly moving forming element 56 of the forming member 55 in contacting engagement with the sheet S also moves vertically downwardly until an annular portion of the sheet S beneath the forming element 56 fills the groove 16 of the ring 13, thereby stretching an end closure portion 12 of the sheet S across the circular void 18 of the ring 13. This stretching of the end closure portion 12 of the sheet S places all incremental portions of the end closure portion 12 under equal tension forces, thereby eliminating wrinkles and the like from end closure portion 15 of the sheet S.

In the position illustrated in FIG. 7, the clamping means 48, 27 are in their lowermost positions, in that springs 31 have been compressed to allow the downward movement of clamp means 27, until the lower surface of the clamp means 27 abuts against sleeves 30 which limit the downward movement of the clamp means 27. The upper base portion 24 then moves vertically downward carrying the cylindrical cutting blade 53 and forming member 55, relative to the clamp means 48, 27, necessitating the compression of the springs 52, to enable such relative movement. The cylindrical cutting blade and the forming member 55 move in unison with the container end support 33, with the ring 13 confined between the forming element 56 and the engaging lip 34 of the end support 33. These vertically downwardly moving elements thereby compress springs 35 beneath the container end support 33, as their downward displacement continues toward the ring back-up member 38.

In FIG. 8 there is illustrated an extreme downward position of the forming member 55 and container end support 33, where the flange forming portion 15 of the ring 13 is in abutting relation against the ring contoured surface 44 of the ring back-up member 38. In this lowermost position of the forming member 55 and support 33 the forming element 56 cooperates with the ring contoured surface 44 of the ring back-up member 38 to compress the peripheral edge portion 17 of the end closure portion 12 of the sheet S within the groove 16 of the ring 13, concurrently with the application of a sufficient amount of heat from the heating coils 46 to bond the peripheral portion 17 of the end closure 12 to the surface of the groove 16 of the ring 13. The heat from the coils 46 is readily transmitted to the portion 17 of the end closure 12 of the sheet S through the flange forming portion 15 of the ring 13, due to the conforming contour of the ring contoured surface 44 immediately below the ring 13.

While the forming member 55 is in its lowermost position as shown in FIG. 8, the upper base portion 24 is moved further downwardly, during which downward movement the springs 60 are compressed, as are the springs 52 compressed in order to facilitate relative vertical motion between the cylindrical cutting blade 53 and the forming member 55 and upper clamp means 48. As the cylindrical cutting blade is moved vertically downward past the flange forming portion 15 of the ring 13, the cutting edge 54 of the cutting blade 53 cuts a cylindrical slit in the sheet S, entirely around the ring 13, thereby separating the end closure portion 12 of the sheet from the remainder of the sheet S and removing the extraneous material of the sheet S from the end closure portion 12. In this position the composite container end 11 is completely formed.

In FIG. 9 there is illustrated a final operational step of the apparatus of this invention, wherein upper and lower clamp means 48, 27, end support 33, the cylindrical cutting blade 53, and the forming member 55 are moved vertically upward, as the upper base portion 24 is moved upward, their respective associated compression springs thereby expanding to return each of the elements to their respective original positions, as illustrated in FIG. 5. The composite container end 11 is retained across the end of the forming member 55, with the forming element 56 positioned within the groove 16 of the ring 13, with the bonded peripheral portion 17 of the end closure 12 therebetween. The composite container end 11 is retained across the end of the forming member 55 by a partial vacuum which is drawn through the vacuum connection 61 and through the cylindrical voids 62 and 64 of the stop ring 63 and forming member 55, respectively.

After the composite container end 11 is lifted from the ring back-up member or die 38, the composite container end 11 may then be readily removed, have a sealing compound 20 applied thereto and be double-seamed to a container body flange 22 of a container body 21. The central portion of the end closure 12 may simultaneously with the double-seaming operation be subjected to an additional tensioning as has been heretofore described, and as is illustrated in FIG. 3.

The springs are precisely calibrated to yield or deflect under a predetermined force, in order to result in a desired tensioning of the end closure 12, in accordance with the particular material of the sheet S being used. Also, the springs are of predetermined calibration to result in a desired deflection under a desired load in order to achieve the relative movements of the various vertically movable members.

The ring 13 may be of any desired material, such as metal or rigid plastic, but metal rings in particular have been found to be most desirable, due to the particular ductility and strength of metal.

The material which is used for the end closure 12 is most desirably a flexible plastic film of single thickness, but may be of a plurality of thicknesses, utilizing a combination of different materials. In their preferred embodiment of this invention, a laminate of Mylar-Saran is used which gives maximum protection against moisture vapor and transmission of oxygen through the material, in which case it has been found desirable to coat the metal ring with a clear vinyl lacquer in order to facilitate the maximum bonding or adhesion between the ring 13 and the end closure 12. Other plastic materials such as Mylar-polyethylene and Mylar-polypropylene have also been used successfully. However, because of the particular nature of Mylar-Saran, in being capable of being heat shrunk and having no apparent change in the clarity of the film under processing temperatures in the general range of 250° Fahrenheit, this particular material has been found to be most desirable. However, where the possibility of the end closure 12 of transmitting oxygen therethrough is not critical, and where a somewhat more cloudy transparent end closure is permissible, Mylar-polyethylene and Mylar-polypropylene may also be used with satisfactory success.

Where visibility through the end closure 12 is not essential, the sheet S could be a laminate of plastic and metal foil or various other combinations, such as plastic, fibre and foil, such as may be desired.

Although only preferred embodiments of the invention have been illustrated and described herein, it is to be understood that various modifications may be made in this invention, within the spirit of this invention.

I claim:

1. A can end forming apparatus comprising means for supporting a container end ring, means for supporting a sheet of bondable material in generally parallel aligned relation with said ring and materially spaced therefrom, means associated with said sheet supporting means for clampingly engaging a sheet of bondable material, means for engaging only that annular portion of supported bondable material axially aligned with a supported ring and said engaging means constituting the sole means contacting said sheet material radially inwardly of said engaging means for moving a central portion of supported bondable material into engagement with a supported ring and stretching the material, and means for bonding stretched material to a supported ring in coextensive relation to a void in such ring.

2. The apparatus of claim 1 wherein said stretching means comprises a forming means movable toward said ring supporting means in a direction normal to the general plane of said ring supporting means.

3. The apparatus of claim 1 including means movable with and relative to said stretching means for removing excess bondable material from a sheet of bondable material circumferentially outwardly of an associated ring.

4. A can end forming apparatus comprising means for supporting a container end ring, means for supporting a sheet of bondable material in generally parallel aligned relation with said ring, means associated with said sheet supporting means for clampingly engaging a sheet of bondable material, means for stretching supported bondable material, and means for bonding stretched material to a supported ring in coextensive relation to a void in such ring, said stretching means comprising a forming means movable toward said ring supporting means in a direction normal to the general plane of said ring supporting means, and said forming means having an end configuration of mating configuration with an intended circumferential groove in a ring and being adapted to engage a ring groove with said sheet of bondable material therebetween.

5 The apparatus of claim 4 including means for heat sealing bondable material to a ring.

6. A can end forming apparatus comprising means for supporting a container end ring, means for supporting a sheet of bondable material in generally parallel aligned relation with said ring, means associated with said sheet supporting means for clampingly engaging a sheet of bondable material, means for stretching supported bondable material, and means for bonding stretched material to a supported ring in coextensive relation to a void in such ring, said ring supporting means being resiliently supported and overlie a back-up member, and said back-up member being provided with heater means for effecting heat sealing bondable material to a supported ring.

7. The apparatus of claim 1 wherein said sheet clamping means are spring loaded to maintain a controlled clamping pressure on sheet material.

8. A can end forming apparatus comprising means for supporting a container end ring, means for supporting a sheet of bondable material in generally parallel aligned relation with said ring, means associated with said sheet supporting means for clampingly engaging a sheet of bondable material, means for stretching supported bondable material, and means for bonding stretched material to a supported ring coextensive relation to a void in such ring, and vacuum means associated with said stretching means to lift a formed end free of said ring supporting means at the termination of a forming operation.

9. The apparatus of claim 8 wherein said excess material removing means are rigidly mounted and said stretching means are resiliently mounted to provide for a timed operation thereof.

References Cited

UNITED STATES PATENTS

| | | | |
|---|---|---|---|
| 2,362,845 | 11/1944 | O'Brien | 220—82 |
| 2,548,303 | 4/1951 | Gora | 156—262X |
| 2,697,057 | 12/1954 | Senger et al. | 156—251X |
| 3,122,990 | 3/1964 | Fried | 220—82X |

ROBERT F. STAHL, Primary Examiner

U.S. Cl. X.R.

156—252, 262, 102; 220—82